(12) United States Patent
Bridgeman et al.

(10) Patent No.: US 6,180,692 B1
(45) Date of Patent: *Jan. 30, 2001

(54) PHASE CHANGE INK FORMULATION WITH ORGANOLEPTIC MASKANT ADDITIVE

(75) Inventors: Randall R. Bridgeman, Hubbard; Donald R. Titterington, Tualatin; Clifford R. King, Salem; Jeffery H. Banning, Hillsboro, all of OR (US)

(73) Assignee: Xerox Corporation, Stamford, CT (US)

( * ) Notice: Under 35 U.S.C. 154(b), the term of this patent shall be extended for 0 days.

This patent is subject to a terminal disclaimer.

(21) Appl. No.: 09/021,599

(22) Filed: Feb. 10, 1998

Related U.S. Application Data

(63) Continuation-in-part of application No. 08/672,815, filed on Jun. 28, 1996, now Pat. No. 5,830,942.

(51) Int. Cl.[7] .................. C08J 3/00; C08K 3/20; C08L 75/00; C09D 5/00; C09D 11/00

(52) U.S. Cl. .................. 523/161; 101/491; 106/31.02; 106/31.13; 106/31.29; 106/31.43; 106/31.61; 523/102; 523/160; 524/210; 524/230; 524/589; 524/590

(58) Field of Search .................. 523/102, 160, 523/161; 524/589, 590, 210, 230; 106/31.13, 31.02, 31.29, 31.43, 31.61; 101/491

(56) References Cited

U.S. PATENT DOCUMENTS

| | | | |
|---|---|---|---|
| 2,409,712 | 10/1946 | Schweitzer | 260/453 |
| 3,012,991 | 12/1961 | Schultheis et al. | 260/75 |
| 3,653,932 | 4/1972 | Berry et al. | 106/22 |
| 3,963,679 | 6/1976 | Ullrich et al. | 260/75 |
| 3,963,710 | 6/1976 | Aufdermarsh, Jr. | 260/247.2 |
| 4,011,311 | 3/1977 | Noomen et al. | 424/65 |
| 4,293,470 | 10/1981 | Cuscurida | 260/45.9 |
| 4,297,501 | 10/1981 | Becker et al. | 560/24 |
| 4,334,032 | 6/1982 | Patton, Jr. et al. | 521/115 |
| 4,381,403 | 4/1983 | Falcone et al. | 560/24 |
| 4,390,369 | 6/1983 | Merritt et al. | 106/31 |
| 4,484,948 | 11/1984 | Merritt et al. | 106/31 |
| 4,501,915 | 2/1985 | McCoy | 560/157 |
| 4,537,960 | 8/1985 | Merger et al. | 544/86 |
| 4,665,146 | 5/1987 | Tortorello et al. | 526/304 |
| 4,684,956 | 8/1987 | Ball | 346/1.1 |
| 4,810,820 | 3/1989 | Slack et al. | 560/27 |
| 4,820,346 * | 4/1989 | Nowak | 106/22 |
| 4,851,045 | 7/1989 | Taniguchi | 106/31 |
| 4,889,560 | 12/1989 | Jaeger et al. | 106/27 |
| 4,889,761 | 12/1989 | Titterington et al. | 428/195 |
| 5,006,170 | 4/1991 | Schwarz et al. | 106/20 |
| 5,059,647 | 10/1991 | Kawaguchi | 524/100 |
| 5,151,120 | 9/1992 | You et al. | 106/27 |
| 5,195,430 | 3/1993 | Rise | 100/168 |
| 5,221,335 | 6/1993 | Williams et al. | 106/23 |
| 5,372,852 | 12/1994 | Titterington et al. | 427/288 |
| 5,389,720 | 2/1995 | Markusch et al. | 524/839 |
| 5,389,958 | 2/1995 | Bui et al. | 347/103 |
| 5,496,879 | 3/1996 | Griebel et al. | 524/320 |
| 5,508,108 * | 4/1996 | Tokiyoski et al. | 428/341 |
| 5,621,022 | 4/1997 | Jaeger et al. | 523/161 |
| 5,780,528 * | 7/1998 | Titterington et al. | 523/161 |
| 5,830,942 * | 11/1998 | King et al. | 524/590 |

FOREIGN PATENT DOCUMENTS

| | | |
|---|---|---|
| 4205636 | 8/1993 | (DE) . |
| 4205713 | 8/1993 | (DE) . |
| 0187352 | 7/1986 | (EP) . |
| 0206286 | 12/1986 | (EP) . |
| 2294939 | 5/1996 | (GB) . |
| 9404619 | 3/1994 | (WO) . |
| 9414902 | 7/1994 | (WO) . |
| 9712003 | 4/1997 | (WO) . |
| 9713816 | 4/1997 | (WO) . |

OTHER PUBLICATIONS

"Polymer Chemistry—The Basic Concepts" by Paul C. Hiemenz, California State Polytechnic University, Pomona, California, p. 7.

"Technical Product Information" Luxate Isophorone Diisocyanate, by Olin Chemicals, Olin Corporation, 2 pgs.

"Advanced Organic Chemistry" Reactions, Mechanisms, and Structure, Third Edition, by Jerry March, Professor of Chemistry, Adelphi University, 6 pgs.

US Manual of Classification, class 106, subclass 31.02, Jun. 30, 1997.*

* cited by examiner

Primary Examiner—Patrick D. Niland
(74) Attorney, Agent, or Firm—Oliff & Berridge, PLC

(57) ABSTRACT

Phase change carrier ink compositions made from the combination of at least one urethane resin; at least one urethane/urea resin; at least one mono-amide; and at least one organoleptic maskant constituent are disclosed. The order of addition of the reactants to form the reactant product urethane resin and urethane/urea resin permits the tailoring or design engineering of desired properties.

53 Claims, No Drawings

PHASE CHANGE INK FORMULATION WITH ORGANOLEPTIC MASKANT ADDITIVE

CROSS-REFERENCE TO RELATED APPLICATIONS

This application is a continuation-in-part application of U.S. Pat. No. 6,830,942 which patent is specifically incorporated herein by reference in its entirety.

BACKGROUND OF THE INVENTION

FIELD OF THE INVENTION

The present invention relates generally to phase change inks. More particularly, the present invention relates to a phase change carrier composition containing the combination of at least one urethane resin, at least one mixed urethane/urea resin, at least one mono-amide, and at least one organoleptic maskant or fragrant additive. Additionally, the present invention relates to inks useful for printing applications formed by adding colorant materials to such carrier compositions. Still further, the present invention relates to processes of using these phase change ink compositions in a printing device.

DESCRIPTION OF THE RELEVANT ART

In general, phase change inks (sometimes referred to as "hot melt inks") are in the solid phase at ambient temperature, but exist in the liquid phase at the elevated operating temperature of an ink jet printing device. At the jet operating temperature, droplets of liquid ink are ejected from the printing device and, when the ink droplets contact the surface of the printing media, they quickly solidify to form a predetermined pattern of solidified ink drops. Phase change inks have also been investigated for use in other printing technologies such as gravure printing as referenced in U.S. Pat. No. 5,496,879 and German patent publications DE 4205636AL and DE 4205713AL assigned to Siegwerk Farbenfabrik Keller, Dr. Rung and Co.

Phase change inks for color printing generally comprise a phase change ink carrier composition, which is combined with a phase change ink compatible colorant. Preferably, a colored phase change ink will be formed by combining the above-described ink carrier composition with compatible subtractive primary colorants. The subtractive primary colored phase change inks of this invention can comprise four component dyes, namely, cyan, magenta, yellow and black. U.S. Pat. Nos. 4,889,506; 4,889,761; and 5,372,852 teach that the subtractive primary colorants employed typically may comprise dyes from the classes of Color Index (C.I.) Solvent Dyes, Disperse Dyes, modified Acid and Direct Dyes, and a limited number of Basic Dyes. The colorants can also include pigments as exemplified in U.S. Pat. No. 5,221,335, assigned to Coates Electrographics LTD. U.S. Pat. No. 5,621,022 issued Apr. 15, 1997, and assigned to Tektronix, Inc., is directed to the use of a specific class of polymeric dyes in phase change ink compositions.

Phase change inks are desirable for ink jet printers since they remain in a solid phase at room temperature during shipping, long-term storage, and the like. Also, the problems associated with nozzle clogging due to ink evaporation are largely eliminated, thereby improving the reliability of ink jet printing. Furthermore, in the above-noted prior art phase change ink jet printers where the ink droplets are applied directly onto the printing medium the droplets solidify immediately upon contact with the substrate, migration of ink along the printing medium is prevented and dot quality is improved. This is also true of the processes and ink compositions described herein.

In addition to the above-referenced U.S. patents, many other patents describe materials for use in phase change ink jet inks. Some representative examples include U.S. Pat. Nos. 3,653,932; 4,390,369; 4,484,948; 4,684,956; 4,851,045; 4,889,560; 5,006,170; and 5,151,120; as well as EP Application Nos. 0187352 and 0206286. These materials can include paraffins, microcrystalline waxes, polyethylene waxes, ester waxes, fatty acids and other waxy materials, fatty amide-containing materials, sulfonamide materials, resinous materials made from different natural sources (tall oil rosins and rosin esters are an example) and many synthetic resins, oligomers, polymers and co-polymers.

Separately, PCT Pat. Application WO 94/14902, which was published on Jul. 7, 1994 and is assigned to Coates Brothers PLC, teaches a hot melt ink containing a colorant and, as a vehicle for the hot melt ink, an oligourethane having a melting point of at least 65° C. and obtained by reacting an aliphatic or aromatic diisocyanate with at least a stoichiometric amount of either: (i) a monohydric alcohol component; or (ii) a monohydric alcohol component followed by another different monohydric alcohol component; or (iii) a monohydric alcohol component, followed by a dihydric alcohol component, followed by a monohydric alcohol component.

This PCT patent application defines the monohydric alcohol component as either a monohydric aliphatic alcohol (e.g. $C_1$ to $C_{22}$ alcohols), an etherified dihydric aliphatic alcohol (e.g. propylene glycol methyl ether (PGME), dipropylene glycol methyl ether (DPGME), ethylene glycol butyl ether (EGBE), diethylene glycol butyl ether (DPGBE), tripropylene glycol butyl ether (TPGBE) and propylene glycol phenyl ether (PPL)); esterified dihydric aliphatic alcohol (e.g. the esterifying acid may be an ethylenically unsaturated acid (such as acrylic acid or methacrylic acid), thereby introducing ethylenic unsaturation into the oligourethane and rendering it suitable for eventual further additional polymerization (curing) after having been applied to a substrate by hot melt printing), or dihydric polyalkylene glycol. This PCT application further defined the dihydric alcohol component as a dihydric aliphatic alcohol or a dihydric polyalkylene glycol (e.g. ethylene glycol, polyethylene glycol (PEG 1500), polypropylene glycol (PPG 750, 1000 and 1500), trimethylene glycol, dipropylene glycol, methylpropanediol and 1,6-hexanediol).

Also, PCT Pat. Application WO 94/04619, assigned to the General Electric Company, teaches the use of ionomeric materials in combination with image forming agents to form a hot melt ink jet ink. The ionomeric materials can include many different types of copolymeric or polymeric ionomers, including carboxyl-functional polyurethanes prepared from a diol or polyol and a hydroxyl acid. Many other carrier materials and colorants for the image forming agent of the invention are included in this PCT application.

Furthermore, U.S. Pat. No. 5,830,942, assigned to the Assignee of the present invention, teaches phase change carrier compositions that comprise the combination of a urethane resin with a urethane/urea resin that may optionally contain other ingredients such as mono-amides and polyethylene waxes. However, that U.S. Patent application does not teach or explicitly suggest a phase change carrier composition that contains the combination of critical ingredients of the carrier compositions with an organoleptic maskant constituent of the present invention.

There is still a need for new materials for novel and different applications of phase change carrier compositions and inks containing such carrier compositions that do not generate offensive odors in inks when the inks are melted for use in phase change ink printers, especially in carrier composition and inks employing low viscosity resins and waxes. Additionally, needs continue to exist for phase change inks utilizing carrier compositions that produce fragrantly pleasing ink sticks and inks upon melting. These needs are solved by the present invention by providing an organoleptic maskant or fragrance that is added directly to these resin materials for specific applications.

BRIEF SUMMARY OF THE INVENTION

It is an aspect of the present invention that phase change carrier compositions comprise an admixture of (1) at least one urethane resin; and/or (2) at least one mixed urethane/urea resin; and (3) at least one mono-amide; and (4) at least one odor maskant or organoleptic maskant constituent that adds a pleasing fragrance to the melted composition to avoid offensive aromas in use or to achieve a desired aroma.

It is another aspect of the present invention that phase change ink compositions comprise the admixture of (a) the above-noted phase change carrier composition with (b) a phase change ink compatible colorant.

It is yet another aspect of the present invention that a method for producing a layer of a phase change colored ink on the surface of a substrate by either direct or indirect printing is obtained wherein the phase change ink composition in the solid phase comprises an admixture of (a) the above-noted phase change carrier composition and (b) a phase change ink compatible colorant.

It is a feature of the present invention that the phase change carrier composition and the colored inks have no odor or possess a pleasant odor upon melting.

It is an advantage of the present invention that phase change carrier compositions and inks of the present invention that the fragrance is released upon melting and remains if left in a printer for an extended period of time.

DESCRIPTION OF THE PREFERRED EMBODIMENTS

The term "nucleophile" in the present specification and claims is used as defined on page 179 of "Advanced Organic Chemistry", 3rd Edition by Jerry March, ©1985 by John Wiley and Sons, to describe a reagent that brings an electron pair to a reaction to form a new bond. The preferred nucleophiles of this invention are alcohols or amines, but it is understood that other nucleophilic functional groups that are capable of reacting with the isocyanate moiety could also be used in the invention.

The term "oligomer" in the current specification and claims is used as defined on page 7 of "Polymer Chemistry—The Basic Concepts" by Paul Hiemenz, 81984 by Marcel Dekker, Inc., to describe a term coined to designate molecules for which n (representing the number of repeating monomer units) is less than 10.

The term "isocyanate-derived resin" as used in the present specification and claims is defined as any monomeric, oligomeric or non-polymeric resinous material derived from the reaction of mono-, di-, or poly-isocyanates with suitable nucleophilic molecules.

The terms "isocyanate-derived wax" as used in the present specification and claims is defined as any crystalline or semicrystalline waxy material derived from the reaction of a fatty isocyanate with a suitable nucleophile, or the reaction of a fatty nucleophile with a suitable isocyanate, or the reaction of a fatty nucleophile with a fatty isocyanate.

The term "urethane resin" or "urethane isocyanate-derived resin" as used in the present specification and claims is defined as any resin that is a urethane that is the product of the reaction of an isocyanate and an alcohol.

The term "mixed urethane/urea resin" or "urethane/urea isocyanate-derived resin" as used in the present specification and claims is defined as any resin that is a mixed urethane/urea that is the product of the reaction of an isocyanate, an alcohol and an amine.

Any suitable reaction condition for making urethane resins or mixed urethane/urea resins by condensing alcohols and/or amines with isocyanates may be employed in the practice of the present invention. Preferably, the reaction is carried out at elevated temperatures (e.g. about 60° C. to about 160° C.) in the presence of a urethane reaction catalyst such as dibutyltindilaurate, bismuth tris-neodecanoate, cobalt benzoate, lithium acetate, stannous octoate or triethyla rine. The reaction conditions preferably are conducted in an inert atmosphere, such as argon or nitrogen gas or other suitable atmosphere, to prevent oxidizing or yellowing the reaction products and to prevent undesirable side reactions. The mole ratio of reactants is adjusted so that the isocyanate functionalities are completely consumed in the reaction with a slight molar excess of alcohol or amine typically remaining. Conceptually the reactants can be added together in any order and/or added to the reaction as physical mixtures. However, in the preferred embodiments of the invention, reaction conditions and the order of the addition of reactants are carefully controlled for several reasons. First, reaction conditions and reactant additions are chosen to provide a controlled exothermic reaction. Secondly, when reacting mixtures of alcohols and/or amines with diisocyanates such as isophorone diisocyanate (IPDI), the order of addition of the isocyanate and the different nucleophiles to the reaction is chosen to tailor the distribution of diurethane molecules, and/or mixed urethane/urea molecules, and/or diurea molecules in the final resin. When doing this, the different reactivities to isocyanates of alcohols versus amines are employed, as are the different reactivities of the two separate isocyanate groups on IPDI. See J. H. Saunders and K. C. Frisch's "Polyurethanes Part I, Chemistry" published by Interscience of New York, N.Y. in 1962 and Olin Chemicals' Luxate™ IM isophorone diisocyanate technical product information sheet which provide further explanation of this chemistry. This control of the reaction conditions and order of addition of the reactants is done to specifically tailor or customize the different types of molecular species in the finished resin so that the resin will:

(1) have a controlled viscosity that is designed for a specific application, (2) have a controlled glass transition temperature and/or melting point, and (3) have consistent properties from batch to batch.

The isocyanate-derived resins from these reactions are generally transparent solids having melting points in the range of about 20° C. to about 150° C., viscosities in the range of about 10 cPs to about 5000 cPs at 150° C. and $T_g$'s of about −30° C. to about 100° C. The isocyanate-derived waxes from these reactions are generally opaque waxy solids having sharp melting points from about 50° C. to about 130° C., and viscosities of about 1 cPs to about 25 cPs at 140° C. The isocyanate-derived resins and waxes display properties such that the higher the $T_g$ and the melting point, the higher is the viscosity. While the structural activity relationships are not fully understood, it is known that the $T_g$ of the isocyanate-derived resins is controlled by the proper choice of the mixture of nucleophiles in the reaction as illustrated in Table 3 in the aforementioned U.S. Pat. No. 5,830,942. Varying one or more of the readily available commodity chemicals used as chemical precursors will permit custom-tailoring of the properties of the isocyanate-derived resin and wax materials.

Preferred alcohols to react with difunctional and higher isocyanates to make either the urethane resins or the urethane/urea resins of this invention include any monohydric alcohol. For instance, the monohydric alcohol could be any aliphatic alcohol [e.g., a $C_1$–$C_{22}$ or higher linear alcohol, any branched alcohol or any cyclic aliphatic alcohol such as methanol, ethanol, (n- and iso)-propanol, (n-, iso-, t-) butanol, (n-, iso-, t-, and the like) pentanol, (n-, iso-, t-, and the like) hexanol, (n-, iso-, t-, and the like) octanol, (n-, iso-, t-, and the like) nonanol, (n- and branched) decanols, (n- and branched) undecanols, (n- and branched) dodecanols, (n- and branched) hexadecanols, (n- and branched) octadecanols, 3-cyclohexyl-1-propanol, 2-cyclohexyl-1-ethanol, cyclohexylmethanol, cyclohexanol, 4-methyl cyclohexanol, 4-ethylcyclohexanol, 4-t-butylcyclohexanol, and the like]; an aliphatic/aromatic alcohol [e.g., benzyl alcohol, octyl, nonyl, and dodecylphenol alkoxylates of octyl, nonyl, and dodecylphenol, and alkoxyphenol]; aromatic alcohols such as phenol, naphthol, and the like, and their derivatives; fused ring alcohols (e.g., rosin alcohols, hydroabietyl alcohol, cholesterol, vitamin E, and the like) and other suitable alcohols (e.g., N,N-dimethyl-N-ethanolamine, stearamide-monoethanolamine, tripropyleneglycol monomethylether, hydroxybutanone, menthol, isoborneol, terpineol, 12-hydroxy stearyl stearamide, and the like). It will be obvious to those skilled in the art that small amounts (on a molar basis) of polyols could also be incorporated into the reaction mixture to produce oligomeric species in the resins if so desired. The preferred alcohols are hydroabietyl alcohol, octylphenol ethoxylate and octadecyl alcohol.

Preferred amines to react with difunctional and higher isocyanates to make the mixed urethane/urea resins of this invention include any monofunctional amine, with the exception of tertiary amines void of other nucleophilic functional groups (e.g., triethylamine). For instance, the mono-amine could be any aliphatic primary or secondary amine (e.g., a $C_1$–$C_{22}$ or higher linear amine, any branched amine or any cyclic aliphatic amine) such as methyl amine, ethyl amine, (n- and iso-)propyl amine, (n-, iso-, and t-) butyl amine, (n-, iso-, t-, and the like) pentyl amine, (n-, iso-, t-, and the like) hexyl amine, (n-, iso-,t-, and the like) octyl amine, (n-, iso-, t-, and the like) nonyl amine, (n- and branched) decyl amine, (n- and branched) undecyl amines, (n- and branched) dodecyl amines, (n- and branched) hexadecyl amines, (n- and branched) dodecyl amines, dimethyl amine, diethyl amine, di(n- and iso-)propyl amines, di(n-, iso-, t-)butyl amine, di(n-, iso-, t-, and the like)pentyl amine, di(n-, iso-, t-, and the like)hexyl amine, di(n-, iso-, t-, and the like)cyclohexyl amine, di(n-, iso-, t-, and the like)heptyl amine, di(n-, iso-, t-, and the like)octyl amine, di(n-, iso-, t-, and the like)decyl amine, di(n-, iso-, t-, and the like)dodecyl amine, di(n-, iso-, t-, and the like)octadecyl amine, cyclohexyl amine, 2,3-dimethyl-1-cyclohexylamine, piperidine, pyrrolidine, and the like; an aliphatic/aromatic amine (e.g., benzyl amine or analogues with longer or additional alkyl chains); aromatic amines such as aniline, anisidine, and the like; fused ring amines such as rosin amine, dehydroabietyl amine, dihydroabietyl amine, hydroabietyl amine, and the like; and miscellaneous amines (e.g., adamantyl amine, isonipecotamide, polyoxyalkylenemonoamines, such as M-series Jeffamines available commercially from Huntsman Chemical Company of Austin, Tex.; 3,3'-diamino-N-methyl-dipropylamine, and the like. It will be obvious to those skilled in the art that small amounts (on a molar basis) of polyamines could also be incorporated into the reaction mixture to produce oligomeric species in the resins if so desired. The preferred amine is octadecyl amine.

Preferred alcohols to react with monofunctional isocyanates to make the mixed urethane/urea resins of this invention include any monohydric alcohol. For instance, the monohydric alcohol could be any aliphatic alcohol [e.g., a $C_1$–$C_{22}$ or higher linear alcohol, any branched alcohol or any cyclic aliphatic alcohol such as methanol, ethanol, (n- and iso-)propanol, (n-, iso-, and t-) butanol, (n-, iso-, t-, and the like) pentanol, (n-, iso-, t-, and the like) hexanol, (n-, iso-, t-, and the like) octanol, (n-, iso-, t-, and the like) nonanol, (n- and branched) decanols, (n- and branched) undecanols, (n- and branched) dodecanols, (n- and branched) hexadecanols, (n- and branched) octadecanols, 3-cyclohexyl-1-propanol, 2-cyclohexyl-1-ethanol, cyclohexylmethanol, cyclohexanol, 4-methyl cyclohexanol, 4-ethylcyclohexanol, 4-t-butylcyclohexanol, and the like]; an aliphatic/aromatic alcohol (e.g., benzyl alcohol, octyl, nonyl, and dodecylphenol alkoxylates or octyl, nonyl, and dodecylphenol, alkoxyphenol); aromatic alcohols such as phenol, naphthol, and the like, and their derivatives; fused ring alcohols (e.g., rosin alcohols, hydroabietyl alcohol, cholesterol, vitamin E, and the like) and other suitable alcohols (e.g., N,N-dimethyl-N-ethanolamine, stearamide-monoethanolamine, tripropyleneglycol monomethylether, hydroxybutanone, menthol, isoborneol, terpineol, 12-hydroxy stearyl stearamide, and the like), as well as multifunctional alcohols such as ethylene glycol, diethylene glycol, triethylene glycol, dimethylolpropionic acid, sucrose, polytetramethylene glycol (MW<~3000), polypropylene glycol (MW<~3000), polyester polyols (MW<~3000), polyethylene glycol (MW<~3000), pentaerythritol, triethanol amine, glycerin, 1,6-hexanediol, N-methyl-N,N-diethanol amine, trimethylol propane, N,N,N',N'-tetrakis(2-hydroxypropyl) ethylenediamine, and the like. The preferred alcohol is octadecanol.

Preferred amines to react with monofunctional isocyanates to make the isocyanate-derived waxes and resins of this invention include any monofunctional amine, with the exception of tertiary amines void of other nucleophilic functional groups (e.g., triethylamine). For instance, the monoamine could be any aliphatic primary or secondary amine [e.g., a $C_1$–$C_{22}$ or higher linear amine, any branched amine or any cyclic aliphatic amine such as methyl amine, ethyl amine, (n- and iso-)propyl amine, (n-, iso-, and t-) butyl amine, (n-, iso-, t-, and the like) pentyl amine, (n-, iso-, t-, and the like) hexyl amine, (n-, iso-, t-, and the like) octyl amine, (n-, iso-, t-, and the like) nonyl amine, (n- and branched) decyl amine, (n- and branched) undecyl amine, (n- and branched) octadecyl amine, (n- and branched) hexadecyl amine, (n- and branched) dodecyl amine, dimethyl amine, diethyl amine, di(n- and iso-)propyl amine, di(n-, iso-, t-)butyl amine, di(n-, iso-, t-, and the like)pentyl amine, di(n-, iso-, t-, and the like)hexyl amine, di(n-, iso-, t-, and the like)cyclohexyl amine, di(n-, iso-, t-, and the like)heptyl amine, di(n-, iso-, t-, and the like)octyl amine, di(n-, iso-, t-, and the like)decyl amine, di(n-, iso-, t-, and the like) octadecyl amine, di(n-, iso-, t-, and the like)dodecyl amine, cyclohexyl amine, 2,3-dimethyl-1-cyclohexylamine, piperidine, pyrrolidine, and the like]; any aliphatic/aromatic amines (e.g., benzyl amine or analogues with longer or additional alkyl chains); aromatic amines such as aniline, anisidine, and the like; fused ring amines such as rosin amine, dehydroabietyl amine, dihydroabietyl amine, hydroabietyl amine, and the like; and miscellaneous amines (e.g., adamantyl amine, isonipecotamide, polyoxyalkylenemono-, di-, or triamines, such as M-, D-, and T-series Jeffamines available commercially from Huntsman Chemical Company of Austin, Tex.; 3,3'-diamino-N-methyl-dipropylamine, and the like, as well as multifunctional amines such as polyethylene imine; ethylene diamine; hexamethylene diamine; isomers of cyclohexyldiamines; 1,3-pentadiamine; 1,12-dodecanediamine; 3-dimethylamino-propylamine; 4,7,10-trioxa-1,13-tridecanediamine; diethylene triamine; 3,3-diamino-N-methyldipropylamine; tris(2-aminoethyl)amine, and the like. The preferred amine is octadecylamine.

Additionally, hydroxyl/amino containing compounds can be employed (with di- and higher functionality isocyanates taking advantage of the difference in reactivity of the amine over the hydroxyl group, or with monoisocyanates reacting with the amine preferentially or with both the amine and the hydroxyl groups). Examples of this include ethanolamine, diethanolamine, and the like.

Additionally, amides or other nucleophile containing compounds can be reacted with the isocyanates (mono, di, and the like). Some examples include: urea, oleamide, stearamide, or the like.

Preferred precursors to the urethane resins and urethane/urea resins of the present invention include mono-, di- and other poly-isocyanates. Examples of monoisocyanates include octadecylisocyanate; octylisocyanate; butyl and t-butylisocyanate; cyclohexyl isocyanate; adamantyl isocyanate; ethylisocyanatoacetate; ethoxycarbonylisocyanate; phenyliso-cyanate; alphamethylbenzyl isocyanate; 2-phenylcyclopropyl isocyanate; benzylisocyanate; 2-ethylphenylisocyanate; benzoylisocyanate; meta and para-tolylisocyanate; 2-, 3-, or 4-nitrophenylisocyanates; 2-ethoxyphenyl isocyanate; 3-methoxyphenyl isocyanate; 4-methoxyphenylisocyanate; ethyl 4-isocyanatobenzoate; 2,6-dimethylphenylisocyante; 1-naphthylisocyanate; (naphthyl)ethylisocyantes; and the like. Examples of diisocyanates include isophorone diisocyanate (IPDI); toluene diisocyanate (TDI); diphenylmethane-4,4'-diisocyanate (MDI); hydrogenated diphenylmethane-4,4'-diisocyanate ($H_{12}$MDI); tetra-methyl xylene diisocyanate (TMXDI); hexamethylene-1,6-diisocyanate (HDI); hexamethylene-1,6-diisocyanate; napthylene-1,5-diisocyanate; 3,3'-dimethoxy-4,4'-biphenyldiisocyanate; 3,3'-dimethyl-4,4'-bimethyl-4,4'-biphenyldiisocyanate; phenylene diisocyanate; 4,4'-biphenyldiisocyanate; trimethylhexamethylene diisocyanate; tetramethylene xylene diisocyanate; 4,4'-methylenebis(2,6-diethylphenyl isocyanate); 1,12-diisocyanatododecane; 1,5-diisocyanato-2-methylpentane; 1,4-diisocyanatobutane; and cyclohexylene diisocyanate and its isomers; uretidione dimers of HDI; and the like. Examples of triisocyanates or their equivalents include the trimethylolpropane trimer of TDI, and the like, isocyanurate trimers of TDI, HDI, IPDI, and the like, and biuret trimers of TDI, HDI, IPDI, and the like. Examples of higher isocyanate functionalities include copolymers of TDI/HDI, and the like, as well as MDI oligomers.

Phase change inks of this invention contain a phase change carrier system or composition. The phase change carrier composition is generally designed for use in either a direct printing mode or use in an indirect or offset printing transfer system. In the direct printing mode, the phase change carrier composition is generally made up of one or more chemicals that provide the necessary properties to allow the phase change ink (1) to be applied in a thin film of uniform thickness on the final receiving substrate when cooled to the ambient temperature after printing directly to the substrate; (2) to be ductile while retaining sufficient flexibility so that the applied image on the substrate will not fracture upon bending; and (3) to possess a high degree of lightness, chroma, transparency and thermal stability. In an offset printing transfer or indirect printing mode, the phase change carrier composition is designed to possess not only the above mentioned properties, but certain fluidic and mechanical properties necessary for use in such a system, as described in U.S. Pat. No. 5,389,958 which is hereby incorporated by reference in pertinent part. The phase change carrier composition and the inks made therefrom which collectively comprise the current invention contain a combination of urethane resins and/or urethane/urea resins, along with another critical ingredient. These critical ingredients can be supplemented with (one or more) optional ingredients to prepare commercial phase change carrier compositions. The urethane resins and mixed urethane/urea resin materials of the current invention are tailored to have the desirable properties mentioned above when used in the carrier composition of the inks of the present invention by varying one or more of the readily available commodity chemical precursors.

The phase change carrier compositions of the current invention may be used in combination with conventional phase change ink colorant materials such as Color Index (C.I.) Solvent Dyes, Disperse Dyes, modified Acid and Direct Dyes, Basic Dyes, Sulphur Dyes, Vat Dyes, and/or polymeric dyes such as those disclosed in U.S. Pat. No. 5,621,022, and/or pigments to produce a phase change ink. Alternatively, the phase change carrier compositions of the current invention may employ colored urethane resins or urethane/urea resins or other isocyanate-derived colored resins as described in U.S. Pat. No. 5,780,528 and assigned to the assignee of the present invention, to produce a phase change ink.

The third critical ingredient of the phase change carrier compositions and the inks made therefrom of the present invention is a mono-amide. A mono-amide compound typically comprises either a primary or secondary mono-amide, but is preferably a secondary mono-amide. Of the primary mono-amides, stearamide, such as KEMAMMIDE S, manufactured by Witco Chemical Company, can be employed herein. As for the secondary mono-amides, behenyl benenamide (KEMAMIDE EX-666), and stearyl stearamide (KEMAMIDE S-180), both manufactured by Witco Chemical Company, are extremely useful mono-amides. However, stearyl stearamide (KEMAMIDE S-180) is the mono-amide of choice in producing the phase change ink compositions of the present invention.

The phase change carrier compositions and the inks made therefrom of the present invention may contain at least one polyethylene wax. Preferably, the polyethylene wax has a molecular weight of about 500 to about 5,000; more preferably, of about 700 to about 2,000; and, most preferably, of about 800 to 1,200. Preferred polyethylene waxes are Polywax 850, Polywax 1000 or Polywax 2000, all available from Petrolite.

Preferably, the total amount of urethane resin or resins in the phase change carrier composition and the inks made therefrom will comprise about 10% to about 40%, more preferably, about 15–35% and most preferably, about 20–30%, by weight of the carrier composition. Preferably, the total amount of mixed urethane/urea resin or resins in the phase change carrier composition will likewise comprise about 10% to about 40%, more preferably about 15–35% and most preferably, about 20–30%, by weight of the carrier composition. Preferably, the total amount of mono-amide wax and polyethylene wax, if used, combined will comprise about 40% to about 70%, more preferably, about 45–60% and most preferably about 48–57% by weight of the carrier composition.

Prior art phase change inks for use in direct and indirect transfer printing systems are described in U.S. Pat. Nos. 4,889,560 and 5,372,852. These inks consist of a phase change ink carrier composition comprising one or more fatty amide-containing materials, usually consisting of a mono-amide wax and a tetra-amide resin, one or more tackifiers, one or more plasticizers and one or more antioxidants, in combination with compatible colorants. A preferred tetra-amide resin is a dimer acid based tetra-amide that is the reaction product of dimer acid, ethylene diamine, and stearic acid. The typical mono-amide is stearyl stearamide. A preferred tackifier resin is a glycerol ester of hydrogenated abietic (rosin) acid and a preferred antioxidant is that provided by Uniroyal Chemical Company under the tradename Naugard 524. The urethane and urethane/urea resins employed in this invention can replace one or more of the ingredients in this prior art carrier composition or inks employing the resin components of the present invention can have all of these prior art ingredients replaced by the urethane and/or urethane/urea resins disclosed herein and/or by isocyanate derived waxes.

Upon melting inks employing the present urethane and/or mixed urethane/urea resins and mono-amide admixture can release potentially offensive aromas, such as sharp pungent or mildewy odors. The use of selected organoleptic maskant contituents or fragrances from about 0.0005% to about 0.25% by weight, and more preferably from about 0.001% to about 0.01% by weight, is effective to either eliminate completely or change the odor of the ink to a more pleasant and identifiable fragrance. Effective organoleptic maskant constituents have been obtained from International Flavors and Fragrances of Union Beach, N.J. identified as 8125-HAZ Golden Forest and 8126 and 8127 HAZ Maskants. All are liquids and possess thermal stability at about 140° C. in the carrier composition, are not extremely volatile, are oil soluble and are chemically inert. Flashpoints ranged from 196° F. to 182° F. to 142° F., respectively. All contain active ingredients selected from the group consisting of esters, lactones, aldehydes, ketones, alcohols, ethers, acetals, ketals, heterocycles, compositions having cumulated double bonds including pheromones, acetylenes, amines and mixtures thereof These functional groups are represented in natural product fragrance extracts, such as Brazilian peppermint.

The advantages of inks formulated with the combination of the aforementioned critical ingredients (urethane resin, mixed urethane/urea resin, mono-amide) and the organoleptic maskant constituent or fragrance over the prior art phase change inks are:

(1) The urethane resins and mixed urethane/urea resins of this invention are very pure, being free of salts and other insoluble contaminants. This makes the inks made from these materials easy to filter and provides for high reliability in ink jet printing devices. This is a major advantage.

(2) The urethane resins and mixed urethane/urea resins of this invention may be specifically tailored to give certain physical properties that optimize the performance of the inks of this invention in ink jet printing devices and on the output substrate. These desirable ink properties include melting point, viscosity, transparency and the dynamic mechanical properties referenced in the aforementioned U.S. Pat. No. 5,389,958.

(3) The urethane resins and mixed urethane/urea resins of this invention are used in combination with the mono-amide wax and polyethylene wax to give ink compositions that display an improved yield stress versus temperature curve over prior art ink compositions. This enables ink droplets to be spread and fused at elevated temperatures during the fusing and transfer steps in an indirect printing process, but at a lower pressure than was possible with prior art inks.

(4) The ink formulations with the added odor maskant or fragrance disclosed herein exhibit no offensive odors, such as sharp, pungent or mildewy odors upon melting and/or provide a pleasing aroma.

Many other patents describe other materials for use in phase change ink jet inks. Some representative examples include U.S. Pat. Nos. 3,653,932; 4,390,369; 4,484,948; 4,684,956; 4,851,045; 5,006,170; 5,151,120; EP Application Nos. 0187352 and 0206286; and PCT Patent Application WO 94/04619. These other materials can include paraffins, microcrystalline waxes, ester waxes, amide waxes, fatty acids, fatty alcohols, fatty amides and other waxy materials, sulfonamide materials, resinous materials made from different natural sources (tall oil rosins and rosin esters are an example) and many synthetic resins, oligomers, polymers, co-polymers, and ionomers. It will be obvious to those skilled in the art that the phase change carrier composition of this invention could optionally contain any of the optional other materials.

The aforementioned U.S. Pat. No. 5,496,879 and German patent publications DE 4205636AL and DE 4205713AL, assigned to Siegwerk Farbenfabrik Keller, Dr. Rung and Co., describe materials used for phase change or hot melt gravure printing. It will be obvious to those skilled in the art that the isocyanate-derived materials of this current invention would be compatible with those materials and could also be used in that application or other similar printing methods that employ hot melt ink technology.

It also will be obvious to those skilled in the art that other ink colors besides the subtractive primary colors are desirable for applications, such as postal marking or industrial marking and labeling using phase change printing, and that this invention is applicable to these needs. Infrared (IR) or ultraviolet (UV) absorbing dyes can also be incorporated into the inks of this invention for use in applications such as "invisible" coding or marking of products.

The inks of the present invention can be equally well employed in apparatus for direct or indirect (offset) printing applications. When employed in direct printing applications a suitable method of printing or producing a layer of a phase change colored ink directly on the surface of a substrate can comprise:

(1) forming a phase change ink composition in the solid phase, comprising an admixture of (a) a phase change carrier composition containing at least one isocyanate-derived resin or wax, (b) an organoleptic constituent, and (c) a phase change compatible colorant.

(2) transferring the solid phase, phase change colored ink composition to a phase change ink application means or print head;

(3) raising the operating temperature of the application means or print head to a level whereby a liquid phase, phase change colored ink composition is formed;

(4) providing a substrate in proximity to the application means;
(5) applying a predetermined pattern of the liquid phase, phase change colored ink composition to at least one surface of the substrate; and
(6) lowering the temperature of the applied ink composition to form a solid phase, phase change ink pattern on the substrate.

An appropriate direct printing process is described in greater detail in U.S. Pat. No. 5,195,430.

When employed in indirect or offset printing applications a suitable method of printing or producing a layer of a phase change colored ink indirectly on the surface of a substrate by transferring from an intermediate transfer surface can comprise:

(1) forming a phase change ink composition in the solid phase, comprising an admixture of (a) a phase change carrier composition containing at least one isocyanate-derived resin or wax, (b) an organoleptic constituent, and (c) a phase change compatible colorant.
(2) transferring the solid phase, phase change colored ink composition to a phase change ink application means or a print head;
(3) raising the operating temperature of the application means or print head to a level whereby a liquid phase, phase change colored ink composition is formed;
(4) providing an intermediate transfer surface in proximity to the application means;
(5) applying a predetermined pattern of the liquid phase, phase change colored ink composition to the intermediate transfer surface;
(6) lowering the temperature of the applied ink composition to form a solid phase, phase change ink pattern on the intermediate transfer surface at a second, intermediate temperature;
(7) transferring said phase change ink composition from the intermediate transfer surface to a final substrate; and
(8) fixing the phase change ink composition to the substrate to form a printed substrate, the phase change ink composition having (a) a compressive yield strength which will allow it to be malleable to spread and deform without an increase in stress when compressive forces are applied thereto at the second operating temperature, and sufficient internal cohesive strength to avoid shear banding and weak behavior when said phase change ink composition is transferred and fixed to said substrate, and (b) a ductility on the substrate after fixing.

An appropriate offset or indirect printing process is described in greater detail in U.S. Pat. No. 5,389,958.

The present invention is further described in detail by means of the following Examples and Comparisons. All parts and percentages are by weight and all temperatures are degrees Celsius unless explicitly stated otherwise. It is to be noted that while the following examples may recite only one colorant, it is to be understood that each individual example is only illustrative and any of the primary colorants (cyan, yellow, magenta and black) used in subtractive color printing could be employed in each instance.

EXAMPLE 1

Cyan Ink Made From Amide Wax, Mixed Urethane/Urea Resin and Cyan Colored Urethane Resin In a stainless steel beaker are combined about 250 grams of the cyan colored resin from Example 2 of U.S. Pat. No. 5,780,528 and assigned to the assignee of the present invention, about 250 grams of the reaction product urethane/urea mixture material from Example 2 of U.S. Pat. No. 5,830,942, about 540 grams of Witco S-180 stearyl stearamide[1], about 2.0 grams of Uniroyal Naugard 445 antioxidant[2], and about 0.01 grams of an IFF 8125 HAZ organoleptic maskant constituent[3]. The materials are melted together at a temperature of 140° C. in an oven, then blended by stirring in a temperature controlled mantle at about 115° C. for about ½ hour. After stirring for about ½ hour, the cyan ink is filtered through a heated Mott apparatus (available from Mott Metallurgical) using #3 Whatman filter paper and a pressure of about 15 psi. The filtered phase change ink is poured into molds and allowed to solidify to form ink sticks. The ink sticks formed are placed in an oven at about 125° C. and covered with foil. A 1 cm² hole is poked in each ink cover and the melted ink emitted a pervasive clean soapy fragrance. The odor persists after the samples are retained in an oven at the same temperature overnight.

[1]Kemamide S-180—Stearyl stearamide available from Witco Chemical Company of Memphis, Tenn. [2]Naugard 445—antioxidant available from Uniroyal Chemical Company of Oxford, Conn. [3]8125-HAZ Golden Forest—organoleptic constituent available from International Flavors and Fragrances of Union Beach, N.J.

This final ink product is characterized by the following physical properties: viscosity of about 13.0 cPs as measured by a Ferranti-Shirley cone-plate viscometer at about 140° C., a melting point of about 89° C. as measured by differential scanning calorimetry using a DuPont 2100 calorimeter, and a $T_g$ of about 27.5° C. as measured by Dynamic Mechanical Analysis using a Rheometrics Solids Analyzer (RSAII). The spectral strength of the ink is determined using a spectrophotographic procedure based on the measurement of the colorant in solution by dissolving the solid ink in butanol and measuring the absorbance using a Perkin Elmer Lambda 2S UV/VIS spectrophotometer. The spectral strength of the ink is measured as about 1069 milliliters·Absorbance Units per gram at λmax.

EXAMPLE 2

Cyan Ink Made From Amide Wax, Mixed Urethane/Urea Resin and Cyan Colored Urethane Resin In a stainless steel beaker are combined about 250 grams of the cyan colored resin from Example 2 of U.S. Pat. No. 5,780,528 and assigned to the assignee of the present invention, about 250 grams of the reaction product urethane/urea mixture material from Example 2 of U.S Pat. No. 5,830,942, about 540 grams of Witco S-180 stearyl stearamidel, about 2.0 grams of Uniroyal Naugard 445 antioxidant[2] and about 0.01 grams of an IFF 8127 HAZ organoleptic maskant constituent[3]. The materials are melted together at a temperature of 140° C. in an oven, then blended by stirring in a temperature controlled mantle at about 115° C. for about ½ hour. After stirring for about ½ hour, the cyan ink is filtered through a heated Mott apparatus (available from Mott Metallurgical) using #3 Whatman filter paper and a pressure of about 15 psi. The filtered phase change ink is poured into molds and allowed to solidify to form ink sticks. The ink sticks formed are placed in an oven at about 125° C. and covered with foil. A 1 cm² hole is poked in each ink cover and the melted ink emitted a pervasive clean soapy fragrance. The odor persists after the samples are retained in an oven at the same temperature overnight.

[1]Kemamide S-180—Stearyl stearamide available from Witco Chemical Company of Memphis, Tenn. [2]Naugard 445—antioxidant available from Uniroyal Chemical Company of Oxford, Conn. [3]8126-HAZ Maskant—organoleptic constituent available from International Flavors and Fragrances of Union Beach, N.J.

This final ink product is characterized by the following physical properties: viscosity of about 13.0 cPs as measured by a Ferranti-Shirley cone-plate viscometer at about 140° C., a melting point of about 89° C. as measured by differential scanning calorimetry using a DuPont 2100 calorimeter, and a $T_g$ of about 27.5° C. as measured by Dynamic Mechanical Analysis using a Rheometrics Solids Analyzer (RSAII). The spectral strength of the ink is determined using a spectrophotographic procedure based on the measurement of the colorant in solution by dissolving the solid ink in butanol and measuring the absorbance using a Perkin Elmer Lambda 2S UV/VIS spectrophotometer. The spectral strength of the ink is measured as about 1069 milliliters·Absorbance Units per gram at λmax.

EXAMPLE 3

Cyan Ink Made From Amide Wax, Mixed Urethane/Urea Resin and Cyan Colored Urethane Resin In a stainless steel beaker are combined about 250 grams of the cyan colored resin from Example 2 of U.S. Pat. No. 5,780,528 and assigned to the assignee of the present invention, about 250 grams of the reaction product urethane/urea mixture material from Example 2 of U.S. Pat. No. 5,830,942, about 540 grams of Witco S-180 stearyl stearamide[1], about 2.0 grams of Uniroyal Naugard 445 antioxidant[2], and about 0.01 grams of an IFF 8126 HAZ organoleptic maskant constituent[3]. The materials are melted together at a temperature of 140° C. in an oven, then blended by stirring in a temperature controlled mantle at about 115° C. for about ½ hour. After stirring for about ½ hour, the cyan ink is filtered through a heated Mott apparatus (available from Mott Metallurgical) using #3 Whatman filter paper and a pressure of about 15 psi. The filtered phase change ink is poured into molds and allowed to solidify to form ink sticks. The ink sticks formed are placed in an oven at about 125° C. and covered with foil. A 1 cm² hole is poked in each ink cover and the melted ink emitted a pervasive light fruity fragrance. The odor persists after the samples are retained in an oven at the same temperature overnight.

[1]Kemamide S-180—Stearyl stearamide available from Witco Chemical Company of Memphis, Tenn. [2]Naugard 445—antioxidant available from Uniroyal Chemical Company of Oxford, Conn. [3]8127-HAZ Maskant—organoleptic constituent available from International Flavors and Fragrances of Union Beach, N.J.

The ink stick final ink product is characterized by the following physical properties: viscosity of about 13.0 cPs as measured by a Ferranti-Shirley cone-plate viscometer at about 140° C., a melting point of about 89° C. as measured by differential scanning calorimetry using a DuPont 2100 calorimeter, and a $T_g$ of about 27.5° C. as measured by Dynamic Mechanical Analysis using a Rheometrics Solids Analyzer (RSAII). The spectral strength of the ink is determined using a spectrophotographic procedure based on the measurement of the colorant in solution by dissolving the solid ink in butanol and measuring the absorbance using a Perkin Elmer Lambda 2S UV/VIS spectrophotometer. The spectral strength of the ink is measured as about 1069 milliliters·Absorbance Units per gram at λmax.

EXAMPLE 4

Black Ink Made From Amide Wax, Mixed Urethane/Urea Resin and Black Colored Urethane Resin In a stainless steel beaker are combined about 301 grams of the colored resin from Example 3 of U.S. Pat. No. 5,780,528 and assigned to the assignee of the present invention, about 374 grams of the reaction product urethane/urea mixture material from Example 2 U.S. Pat. No. 5,830,942, about 802 grams of Witco S-180 stearyl stearamide[1], about 3.0 grams of Uniroyal Naugard 445 antioxidant[2], and about 0.02 grams of IFF 8125 HAZ organoleptic maskant constituent[3]. The materials are melted together at a temperature of about 140° C. in an oven, then blended by stirring in a temperature controlled mantle at about 115° C. for about ½ hour. The black ink is then filtered through a heated Mott apparatus (available from Mott Metallurgical) using #3 Whatman filter paper and a pressure of about 15 psi. The filtered phase change ink is poured into molds and allowed to solidify to form ink sticks. The ink sticks formed are placed in an oven at about 125° C. and covered with foil. A 1 cm² hole is poked in each ink cover and the melted ink emitted a pervasive clean soap fragrance. The odor persists after the samples were retained in an oven at the same temperature overnight.

[1]Kemamide S-180—Stearyl stearamide available from Witco Chemical Company of Memphis, Tenn. [2]Naugard 445—antioxidant available from Uniroyal Chemical Company of Oxford, Conn. [3]8125-HAZ Golden Forest—organoleptic constituent available from International Flavors and Fragrances of Union Beach, N.J.

This final ink product is characterized by the following physical properties: viscosity of about 13.3 cPs as measured by a Ferranti-Shirley cone-plate viscometer at about 140° C., a melting point of about 89° C. as measured by differential scanning calorimetry using a DuPont 2100 calorimeter, and a $T_g$ of about 16° C. as measured by Dynamic Mechanical Analysis using a Rheometrics Solids Analyzer (RSAII). The spectral strength of the ink is determined using a spectrophotographic procedure based on the measurement of the colorant in solution by dissolving the solid ink in butanol and measuring the absorbance using a Perkin Elmer Lambda 2S UV/VIS spectrophotometer. The spectral strength of the ink is measured as about 869 milliliters·Absorbance Units per gram at λmax.

EXAMPLE 5

Black Ink Made From Amide Wax, Mixed Urethane/Urea Resin and Black Colored Urethane Resin In a stainless steel beaker are combined about 301 grams of the colored resin from Example 3 of U.S. Pat. No. 5,780,528 and assigned to the assignee of the present invention, about 374 grams of the reaction product rethane/urea mixture material from Example 2 of U.S. Pat. No. 5,830,942, about 802 grams of Witco S-180 stearyl stearamide[1], about 3.0 grams of Uniroyal Naugard 445 antioxidant[2], and about 0.02 grams of IFF 8126 HAZ organoleptic maskant constituent[3]. The materials are melted together at a temperature of about 140° C. in an oven, then blended by stirring in a temperature controlled mantle at about 115° C. for about ½ hour. The black ink is then filtered through a heated Mott apparatus (available from Mott Metallurgical) using #3 Whatman filter paper and a pressure of about 15 psi. The filtered phase change ink is poured into molds and allowed to solidify to form ink sticks. The ink sticks formed are placed in an oven at about 125° C. and covered with foil. A 1 cm² hole is poked in each ink cover and the melted ink emitted a pervasive clean soap fragrance. The odor persists after the samples were retained in an oven at the same temperature overnight.

[1]Kemamide S-180—Stearyl stearamide available from Witco Chemical Company of Memphis, Tenn. [2]Naugard 445—antioxidant available from Uniroyal Chemical Company of Oxford, Conn. [3]8126-HAZ Maskant—organoleptic constituent available from International Flavors and Fragrances of Union Beach, N.J.

This final ink product is characterized by the following physical properties: viscosity of about 13.3 cPs as measured by a Ferranti-Shirley cone-plate viscometer at about 140° C., a melting point of about 89° C. as measured by differential scanning calorimetry using a DuPont 2100 calorimeter, and a $T_g$ of about 16° C. as measured by Dynamic Mechanical Analysis using a Rheometrics Solids Analyzer (RSAII). The spectral strength of the ink is determined using a spectrophotographic procedure based on the measurement of the colorant in solution by dissolving the solid ink in butanol and measuring the absorbance using a Perkin Elmer Lambda 2S UV/VIS spectrophotometer. The spectral strength of the ink is measured as about 869 milliliters·Absorbance Units per gram at λmax.

EXAMPLE 6

Black Ink Made From A mide Wax, Mixed Urethane/Urea Resin and Black Colored Urethane Resin In a stainless steel beaker are combined about 301 grams of the colored resin from Example 3 of U.S. Pat. No. 5,780,528 and assigned to the assignee of the present invention, about 374 grams of the reaction product urethane/urea mixture material from Example 2 U.S. Pat. No. 5,830,942, about 802 grams of Witco S-180 stearyl stearamide[1], about 3.0 grams of Uniroyal Naugard 445 antioxidant[2], and about 0.02 grams of IFF 8127 HAZ organoleptic maskant constituent[3]. The materials are melted together at a temperature of about 140° C. in an oven, then blended by stirring in a temperature controlled mantle at about 115° C. for about ½ hour. The black ink is then filtered through a heated Mott apparatus (available from Mott Metallurgical) using #3 Whatman filter paper and a pressure of about 15 psi. The filtered phase change ink is poured into molds and allowed to solidify to form ink sticks. The ink sticks formed are placed in an oven at about 125° C. and covered with foil. A 1 cm² hole is poked in each ink cover and the melted ink emitted a pervasive light fruity fragrance. The odor persists after the samples were retained in an oven at the same temperature overnight.

[1]Kemamide S-180—Stearyl stearamide available from Witco Chemical Company of Memphis, Tenn. [2]Naugard 445—antioxidant available from Uniroyal Chemical Company of Oxford, Conn. [3]8127-HAZ Maskant—organoleptic constituent available from International Flavors and Fragrances of Union Beach, N.J.

This final ink product is characterized by the following physical properties: viscosity of about 13.3 cPs as measured by a Ferranti-Shirley cone-plate viscometer at about 140° C., a melting point of about 89° C. as measured by differential scanning calorimetry using a DuPont 2100 calorimeter, and a $T_g$ of about 16° C. as measured by Dynamic Mechanical Analysis using a Rheometrics Solids Analyzer (RSAII). The spectral strength of the ink is determined using a spectrophotographic procedure based on the measurement of the colorant in solution by dissolving the solid ink in butanol and measuring the absorbance using a Perkin Elmer Lambda 2S UV/VIS spectrophotometer. The spectral strength of the ink is measured as about 869 milliliters·Absorbance Units per gram at λmax.

While the invention has been described above with reference to specific embodiments thereof, it is apparent that many changes, modifications and variations can be made without departing from the inventive concept disclosed herein. For example, it should be noted that an organoleptic maskant constituent may be used with any appropriate phase change ink formulations, including those described herein. Accordingly, it is intended to embrace all such changes, modifications and variations that fall within the spirit and broad scope of the appended claims. All patent applications, patents and other publications cited herein are incorporated by reference in their entirety.

What is claimed is:

1. A phase change ink carrier composition for use in an ink jet printer comprising:

(a) a urethane resin that is the reaction product of the reaction of at least one alcohol and an isocyanate, the alcohol further being selected from the group of alcohols consisting of a monohydric aliphatic alcohol, a monohydric aromatic alcohol, a monohydric aliphatic/aromatic alcohol, a monohydric fused ring alcohol, a polyol and mixtures thereof; and/or (b) a mixed urethane/urea resin that is the reaction product of at least one alcohol, an isocyanate, and at least one monoamine;

(c) a mono-amide; and (d) an organoleptic maskant constituent.

2. The phase change ink carrier composition of claim 1 further comprising the organoleptic maskant constituent comprising from about 0.0005 to about 0.25% by weight.

3. The phase change ink carrier composition of claim 1 further comprising the organoleptic maskant constituent comprising less than about 0.2% by weight.

4. The phase change ink carrier composition of claim 1 further comprising the organoleptic maskant constituent being selected from the group consisting of esters, lactones, aldehydes, ketones, alcohols, ethers, acetals, ketals, heterocycles, compositions having cumulated double bonds and mixtures thereof.

5. The phase change ink carrier composition of claim 1 further comprising isocyanate in the urethane resin being selected from the group consisting of a monoisocyanate, a diisocyanate, a triiusocyanate, a copolymer of a diisocyanate, and a copolymer of a triisocyanate.

6. The phase change ink carrier composition of claim 5 further comprising the isocyanate in the urethane resin being isophorone diisocyanate.

7. The phase change ink carrier composition of claim 6 wherein the alcohol is selected from the group consisting of hydroabietyl alcohol, octylphenol ethoxylate and octadecyl alcohol.

8. The phase change ink carrier composition of claim 7 wherein the alcohol in the urethane resin is octylphenol ethoxylate.

9. The phase change ink carrier composition of claim 8 wherein the alcohol in the mixed urethane/urea resin is selected from the group of alcohols consisting of a monohydric aliphatic alcohol, a monohydric aromatic alcohol, a monohydric aliphatic/aromatic alcohol, a monohydric fused ring alcohol, a polyol and mixtures thereof.

10. The phase change ink carrier composition of claim 9 wherein the alcohol in the mixed urethane/urea resin is selected from the group consisting of hydroabietyl alcohol, octylphenol ethoxylate and octadecyl alcohol.

11. The phase change ink carrier composition of claim 10 wherein the isocyanate employed in making the mixed urethane/urea resin reaction product is selected from the group consisting of a monoisocyanate, a diisocyanate, a triisocyanate, a copolymer of a diisocyanate, and a copolymer of a triisocyanate.

12. The phase change ink carrier composition of claim 11 wherein the isocyanate employed in making the mixed urethane/urea resin reaction product is isophorone diisocyanate.

13. The phase change ink carrier composition of claim 12 wherein the amine in the mixed urethane/urea resin is selected from the group of amines consisting of an aliphatic monoamine, an aromatic monoamine, an aliphatic/aromatic monoamine, a fused ring system monoamine, a multifunctional monoamine, and a hydroxyl/amino containing compound.

14. The phase change ink carrier composition of claim 13 wherein the amine in the mixed urethane/urea resin is octadecyl amine.

15. The phase change ink carrier composition of claim 1 further comprising an antioxidant.

16. A method for producing a layer of a phase change ink on a surface of a substrate, which comprises:

(1) forming a phase change ink composition in the solid phase, comprising an admixture of (a) a phase change carrier composition and (b) a compatible phase change colorant material; the phase change carrier composition comprising a urethane resin that is the reaction product of at least one alcohol and an isocyanate, a urethane/urea resin that is the reaction product of an isocyanate and at least one monoamine, a mono-amide and an organoleptic maskant constituent;

(2) transferring the solid phase, phase change ink composition to a phase change ink application means;

(3) raising the operating temperature of the application means to a level whereby a liquid phase, phase change ink composition is formed;

(4) providing a substrate in proximity to said application means;

(5) applying a predetermined pattern of the liquid phase, phase change ink composition to at least one surface of said substrate;

(6) lowering the temperature of the applied ink composition to form a solid phase, phase change ink pattern on the substrate.

17. A method for producing a layer of a phase change ink on the surface of a substrate, which comprises:

(1) employing in a printing apparatus a phase change ink composition in the solid phase comprising an admixture of (a) a phase change carrier composition and (b) a compatible phase change colorant material; the phase change carrier composition comprising a urethane resin that is the reaction product of at least one alcohol and an isocyanate, a urethane/urea resin that is the reaction product of an isocyanate and at least one monoamine, a mono-amide and an organoleptic maskant constituent;

(2) applying the phase change ink composition in a desired pattern to an intermediate transfer surface;

(3) transferring the desired pattern of the phase change ink composition to the surface of the substrate.

18. The phase change ink carrier composition of claim 1 further comprising the organoleptic maskant constituent being selected from the group consisting of pheromones, acetylenes, amines and mixtures thereof.

19. An ink composition comprising the phase change ink carrier composition of claim 1 and a phase change compatible colorant.

20. An ink composition comprising the phase change ink carrier composition of claim 1 and a phase change compatible colorant.

21. An ink composition according to claim 20 wherein the phase change compatible colorant comprises an isocyanate-derived colored resin comprising the reaction product of an isocyanate and at least one chromogen-containing nucleophile.

22. An ink composition according to claim 21 wherein the phase change compatible colorant comprises an isocyanate-derived colored resin comprising the reaction product of (a) an isocyanate, (b) a first nucleophile selected from the group consisting of at least one alcohol, at least one amine, and mixtures thereof, and (c) at least one chromogen-containing second nucleophile.

23. An ink composition according to claim 21 wherein the chromogen-containing nucleophile is a dye containing at least one alcohol functional group.

24. An ink composition according to claim 21 wherein the chromogen-containing nucleophile is a polymeric dye.

25. An ink composition according to claim 21 wherein the chromogen-containing nucleophile has at least one alcohol functional group that is terminal to a butylene oxide, styrene oxide, polyethylene oxide, polypropylene oxide, or a polyethylene/polypropylene oxide polymeric chain.

26. An ink composition according to claim 22 wherein first nucleophile is selected from the group consisting of monohydric alcohols consisting of an aliphatic alcohol, an aromatic alcohol and derivatives thereof, an aliphatic/aromatic alcohol, a fused ring alcohol, and a multifunctional alcohol.

27. An ink composition according to claim 22 wherein the first nucleophile is selected from the group consisting of hydroabietyl alcohol, octylphenol ethoxylate, octadecyl alcohol, octadecanol, and mixtures thereof.

28. An ink composition according to claim 21 wherein the colored resin is a colored diurethane resin.

29. An ink composition according to claim 21 wherein the resin is a colored diurea resin.

30. An ink composition according to claim 21 wherein the resin is a colored urethane/urea resin.

31. An ink composition according to claim 22 wherein the first nucleophile is selected from a group of monoamines consisting of an aliphatic amine, an aromatic amine, an aliphatic/aromatic amine, a fused ring system amine, a multifunctional amine, a hydroxyl/amino containing compound, an amide, and mixtures thereof.

32. An ink composition according to claim 22 wherein the first nucleophile is octadecyl amine.

33. An ink composition according to claim 21 wherein the isocyanate is selected from the group consisting of a monoisocyanate, a diisocyanate, a triisocyanate, a copolymer of a diisocyanate, and a copolymer of a triisocyanate.

34. An ink composition according to claim 21 wherein the isocyanate is isophorone diisocyanate.

35. An ink composition according to claim 22 wherein the isocyanate is isophorone diisocyanate, the first nucleophile is octylphenol ethoxylate, and the chromogen-containing second nucleophile is a polymeric dye.

36. An ink composition according to claim 22 wherein the isocyanate is isophorone diisocyanate, the first nucleophile is octylphenol ethoxylate, and the chromogen-containing second nucleophile is selected from the group consisting of

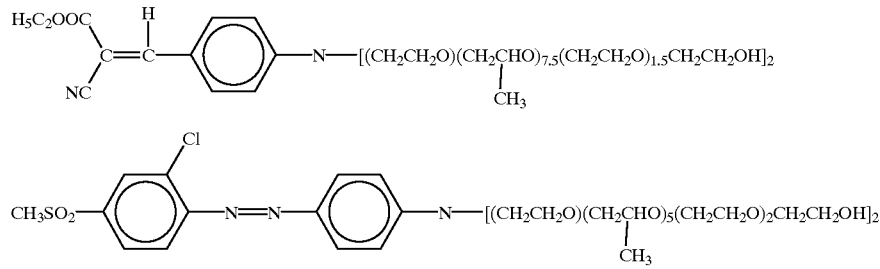

-continued

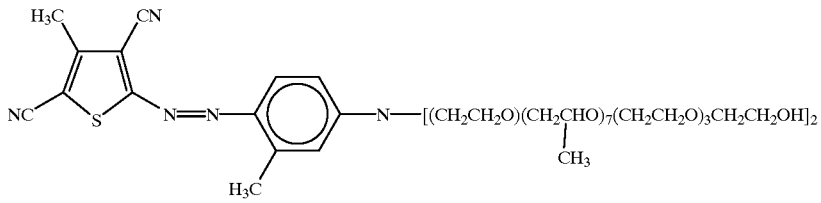

and mixtures thereof.

37. An ink composition according to claim 20 wherein the phase change compatible colorant comprises an isocyanate-derived colored resin comprising the reaction product of an isocyanate and at least one chromogen-containing nucleophile.

38. An ink composition according to claim 37 wherein the phase change compatible colorant comprises an isocyanate-derived colored resin comprising the reaction product of (a) an isocyanate, (b) a first nucleophile selected from the group consisting of at least one alcohol, at least one amine, and mixtures thereof, and (c) at least one chromogen-containing second nucleophile.

39. An ink composition according to claim 37 wherein the chromogen-containing nucleophile is a dye containing at least one alcohol functional group.

40. An ink composition according to claim 37 wherein the chromogen-containing nucleophile is a polymeric dye.

41. An ink composition according to claim 37 wherein the chromogen-containing nucleophile has at least one alcohol functional group that is terminal to a butylene oxide, styrene oxide, polyethylene oxide, polypropylene oxide, or a polyethylene/polypropylene oxide polymeric chain.

42. An ink composition according to claim 38 wherein first nucleophile is selected from the group consisting of monohydric alcohols consisting of an aliphatic alcohol, an aromatic alcohol and derivatives thereof, an aliphatic/aromatic alcohol, a fused ring alcohol, and a multifunctional alcohol.

43. An ink composition according to claim 38 wherein the first nucleophile is selected from the group consisting of hydroabietyl alcohol, octylphenol ethoxylate, oc tadecyl alcohol, octadecanol, and mixtures thereof.

44. An ink composition according to claim 37 wherein the colored resin is a colored diurethane resin.

45. An ink composition according to claim 37 wherein the resin is a colored diurea resin.

46. An ink composition according to claim 37 wherein the resin is a colored urethane/urea resin.

47. An ink composition according to claim 38 wherein the first nucleophile is selected from a group of monoamines consisting of an aliphatic amine, an aromatic amine, an aliphatic/aromatic amine, a fused ring system amine, a multifunctional amine, a hydroxyl/amino containing compound, an amide, and mixtures thereof.

48. An ink composition according to claim 38 wherein the first nucleophile is octadecyl amine.

49. An ink composition according to claim 37 wherein the isocyanate is selected from the group consisting of a monoisocyanate, a diisocyanate, a triisocyanate, a copolymer of a diisocyanate, and a copolymer of a triisocyanate.

50. An ink composition according to claim 37 wherein the isocyanate is isophorone diisocyanate.

51. An ink composition according to claim 38 wherein the isocyanate is isophorone diisocyanate, the first nucleophile is octylphenol ethoxylate, and the chromogen-containing second nucleophile is a polymeric dye.

52. An ink composition according to claim 38 wherein the isocyanate is isophorone diisocyanate, the first nucleophile is octylphenol ethoxylate and the chromogen-containing second nucleophile is selected from the group consisting of

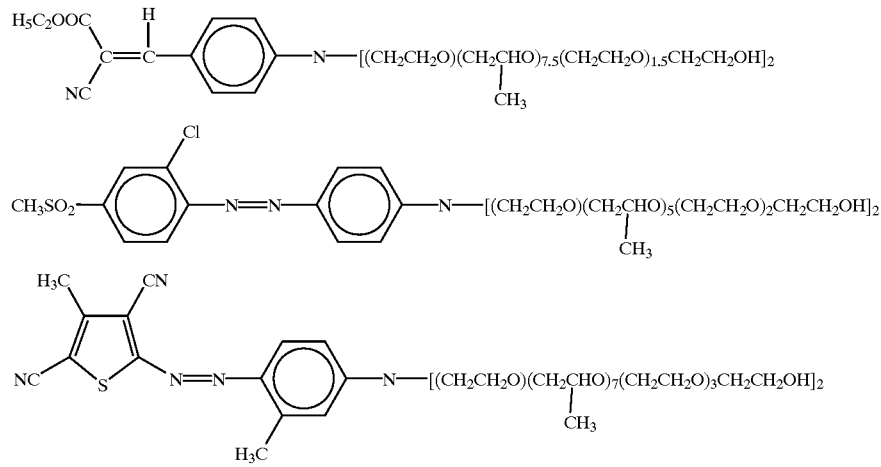

and mixtures thereof.

53. The ink composition of claim 19, wherein the phase change compatible colorant is a dye, a colored resin or a pigment.

* * * * *